(12) United States Patent
Setbacken et al.

(10) Patent No.: US 8,497,468 B2
(45) Date of Patent: Jul. 30, 2013

(54) ENCODER HAVING AN OVERMOLDED COVER, ENCODER SYSTEM WITH AN ENCODER HAVING AN OVERMOLDED COVER, AND METHOD FOR MANUFACTURING AN ENCODER HAVING AN OVERMOLDED COVER

(75) Inventors: Robert M. Setbacken, Santa Barbara, CA (US); Gary Rhodes, Goleta, CA (US); Esteban Cortina, Santa Barbara, CA (US); Tony Cepeda, Santa Maria, CA (US)

(73) Assignee: Heidenhain Corporation, Schaumburg, IL (US)

( * ) Notice: Subject to any disclaimer, the term of this patent is extended or adjusted under 35 U.S.C. 154(b) by 1172 days.

(21) Appl. No.: 11/961,864

(22) Filed: Dec. 20, 2007

(65) Prior Publication Data

US 2009/0159787 A1 Jun. 25, 2009

(51) Int. Cl.
 *G01D 5/34* (2006.01)
(52) U.S. Cl.
 USPC ..................................... 250/231.13

(58) Field of Classification Search
 USPC ........................................ 250/231.13–231.18
 See application file for complete search history.

(56) References Cited

U.S. PATENT DOCUMENTS

| 2002/0000512 | A1* | 1/2002 | Thaler et al. | 250/231.13 |
| 2006/0131489 | A1* | 6/2006 | Riepertinger | 250/231.13 |
| 2007/0210675 | A1* | 9/2007 | Bender | 310/268 |
| 2008/0142694 | A1* | 6/2008 | Rhodes et al. | 250/231.13 |

FOREIGN PATENT DOCUMENTS

CN 2 814 343 9/2006

OTHER PUBLICATIONS

Chinese Office Action, dated Jan. 18, 2012, issued in corresponding Chinese Patent Application No. 200810185383.9.

* cited by examiner

*Primary Examiner* — Thanh Luu
(74) *Attorney, Agent, or Firm* — Kenyon & Kenyon LLP

(57) ABSTRACT

An encoder includes a rotor including: a shaft and a code disk attached to the shaft; a stator including a scanning unit configured to generate an electrical signal corresponding to an angular position of the code disk; a cable configured to transfer the electrical signal; and a cover overmolded onto the stator, where the scanning unit is sealed from an outer environment by the cover.

23 Claims, 7 Drawing Sheets

ENCODER HAVING AN OVERMOLDED COVER, ENCODER SYSTEM WITH AN ENCODER HAVING AN OVERMOLDED COVER, AND METHOD FOR MANUFACTURING AN ENCODER HAVING AN OVERMOLDED COVER

FIELD OF THE INVENTION

The present invention relates an encoder, e.g., a rotary encoder, having an overmolded cover. The present invention also relates to an encoder system with an encoder having an overmolded cover. The present invention further relates to a method for manufacturing an encoder having an overmolded cover.

BACKGROUND INFORMATION

Rotary encoders are used to measure angular displacement of a rotating member, typically a hollow or solid shaft. Typical rotary encoders use a separate plastic or metal part as a cover for the encoder. The encoder may be supplied to a customer with the cover attached, or the cover may be installed by the customer. When the cover is installed by the encoder manufacturer, it may also include a cable strain relief. The cover may be fixed with screws, glue, snaps, press fit, or a combination thereof. If environmental sealing is required, usually an o-ring is used to seal an interface between the cover and the encoder. Because such covers are formed as separate parts prior to attachment to an encoder, it may be important to maintain low dimensional tolerances to ensure a proper fit, which can increase manufacturing costs. Moreover, because these covers typically require additional parts for attachment and/or sealing, additional time and cost may be incurred in having to manufacture and/or assemble the multiple parts. The complexity of having multiple parts may also reduce the reliability of attachment and/or sealing properties of the cover. These covers may also fail to provide adequate strain relief to cables used to transfer electrical signals from the encoders to, e.g., control systems.

SUMMARY

According to an example embodiment of the present invention, an encoder includes: a rotor including a shaft and a code disk attached to the shaft; a stator including a scanning unit configured to generate an electrical signal corresponding to an angular position of the code disk; a cable configured to transmit the electrical signal; and a cover overmolded onto the stator and the cable. The scanning unit is sealed from an outer environment by the cover, and the cable is strain relieved by the cover.

The rotor may be rotatably supported within the stator by a rolling bearing.

The cover may contact and insulate an electrical lead of an integrated circuit of the scanning unit.

The cover may contact and insulate a plurality of electrical leads of the integrated circuit.

The cover may include a tubular extension surrounding the cable.

A wall thickness of the tubular extension may taper along the length of the tubular extension in a direction away from the stator.

The tubular extension may be elastically flexible.

The encoder may include a masking between the cover and the stator.

The stator and the cable may include complementary connectors, and the cover may be overmolded onto the connectors to prevent uncoupling of the connectors.

The stator may have an undercut, and the cover may extend a distance into the undercut.

The stator may have a channel extending around a surface of the stator, and the cover may extend into the channel.

The stator may include a mounting flange.

The cover may be separated from the mounting flange by an annular section of the stator.

An outer diameter of the annular section may be the same as an outer diameter of the cover.

The cable may include a bend of approximately 180 degrees, and the bend may be enclosed by the cover.

According to an example embodiment of the present invention, an encoder system includes an encoder and a motor. The encoder includes: a rotor having a shaft and a code disk attached to the shaft; an stator having a scanning unit configured to generate an electrical signal corresponding to an angular position of the code disk; a cable configured to transmit the electrical signal; and a cover overmolded onto the encoder stator and the cable, the scanning unit sealed from an outer environment by the cover and the cable strain relieved by the cover. The motor includes a rotor rotatably coupled to a stator, the rotor of the encoder coupled to the rotor of the motor, the stator of the encoder coupled to the stator of the motor.

According to an example embodiment of the present invention, a method of manufacturing an encoder includes: positioning a stator of the encoder and a portion of a cable of the encoder coupled to the stator into a mold; and overmolding, by an injection molding process, a cover onto the stator and the cable, the cover sealing the stator from an outer environment and strain relieving the cable.

The cover may be formed of an elastomer, and the injection molding may include low-pressure injection molding.

The method may include applying a masking to the stator prior to the overmolding.

The method may include folding the cable by approximately 180 degrees prior to the overmolding, and the cover may be overmolded onto the bend.

It should be appreciated that the encoder, the encoder system and the method of manufacturing an encoder may have any one or more of the features described herein.

Further details and aspects of example embodiments of the present invention are described in more detail below with reference to the appended Figures.

BRIEF DESCRIPTION OF THE DRAWINGS

FIG. 4b is a perspective view of the encoder illustrated in FIG. 4a.

DETAILED DESCRIPTION

Figure 1:
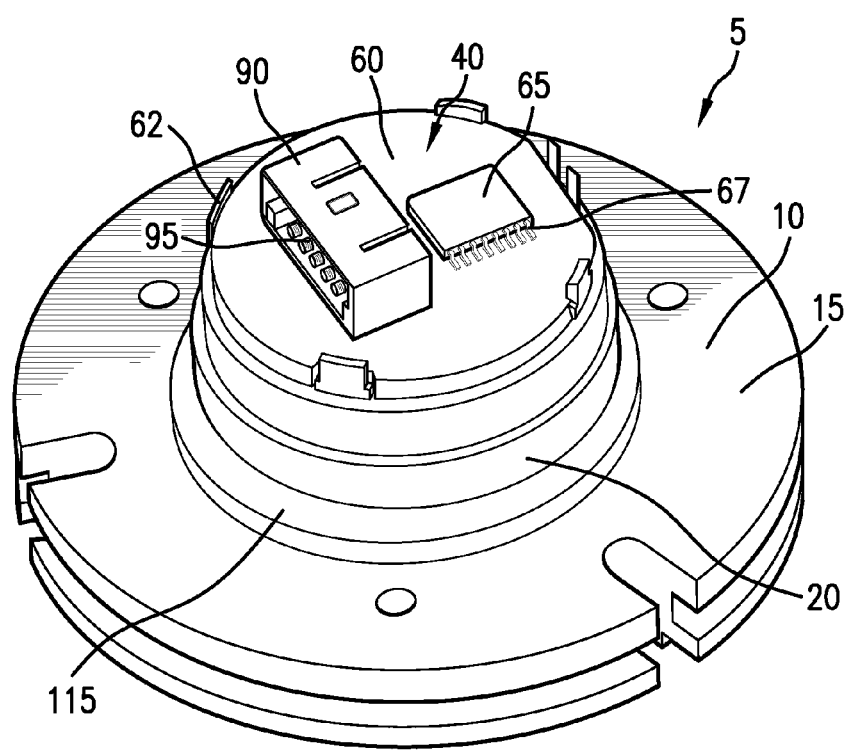
FIG. 1 is a perspective view of an encoder.
Figure 2:
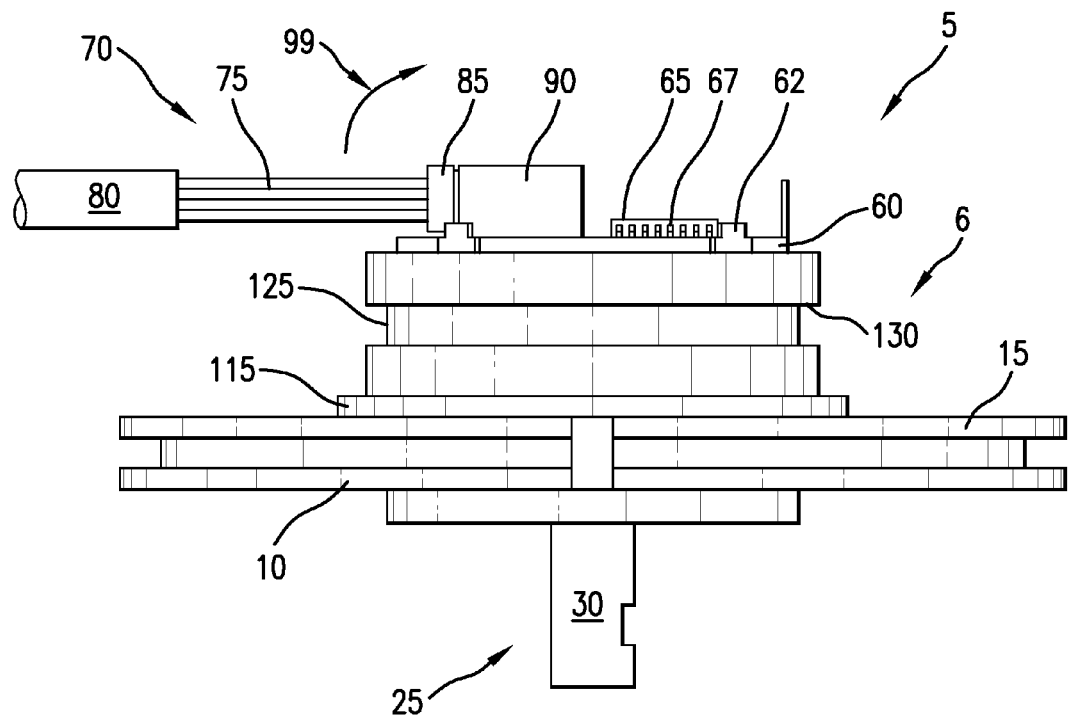
FIG. 2 is a side view of the encoder illustrated in FIG. 1.
Figure 3:
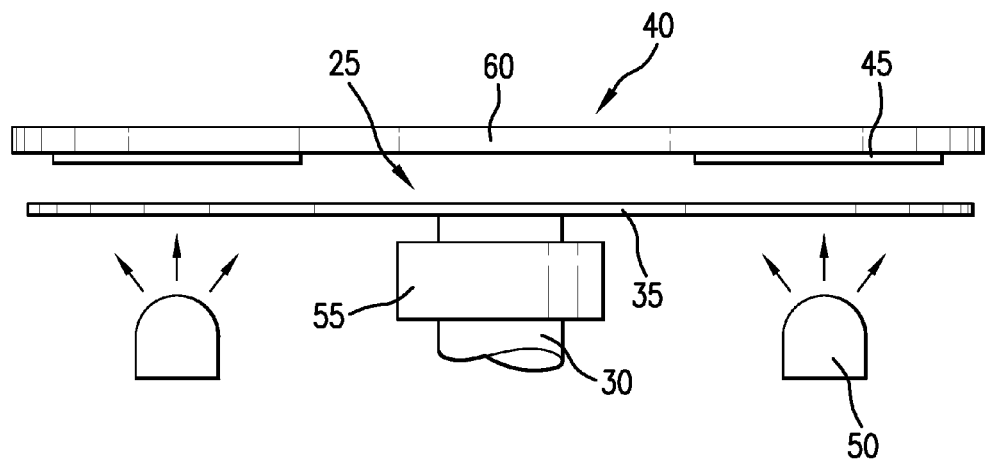
FIG. 3 is a side view of part of the encoder illustrated in FIG. 1.

Referring to FIGS. 1 and 2, an encoder 5 has a base 10 having a mounting flange 15 and a housing portion 20. The mounting flange 15 allows the encoder 5 to be mounted, e.g., to a motor, e.g., an electric motor. The base 10, along with components that do not rotate with the rotor, forms the stator 6 of the encoder 5. Arranged in the base 10 is a rotor 25 including a shaft 30 and a code disk 35 attached to, and rotatable with, the shaft 30, as illustrated in FIG. 3. A scanning unit 40 generates electrical signals corresponding to the angular position of the code disk 35. The scanning unit 40 includes photodiode detectors 45 that sense light passing through slots of the code disk 35 from a light source 50. The photodiode detectors 45 are mounted on the substrate of a printed circuit board 60 which is mounted to the base 10 by clips 62. Although the illustrated system uses optical encoding technology, it should be appreciated that other encoding technologies may be used, such as, e.g., magnetic encoding. The rotor 25 is rotatably mounted to the stator 6 by a rolling bearing 55. The scanning unit 40 has an integrated circuit 65 having electrical leads 67 and being mounted onto the printed circuit board 60 for processing the photodiode signals. After processing, the electrical signals are transmitted via a cable 70 that includes a bundle of wires 75 covered by an outer sheath 80. The wires 75 may be individually insulated. The cable 70, in addition to transmitting electrical signals, may supply power, control commands, etc., to the encoder. The cable 70 is attached to the scanning unit 40 by mating a connector 85, e.g., a male connector, of the cable 70 to a connector 90, e.g., a female connector, of the scanning unit 40. The connector 90 has electrical contacts 95 that couple with corresponding electrical contacts of the connector 85 for transferring electrical signals. Prior to an injection molding process, the cable 70 may be bent in a direction 99, such that the wires 75 of the cable 70 are folded or bent by approximately 180 degrees.

Figure 4A:
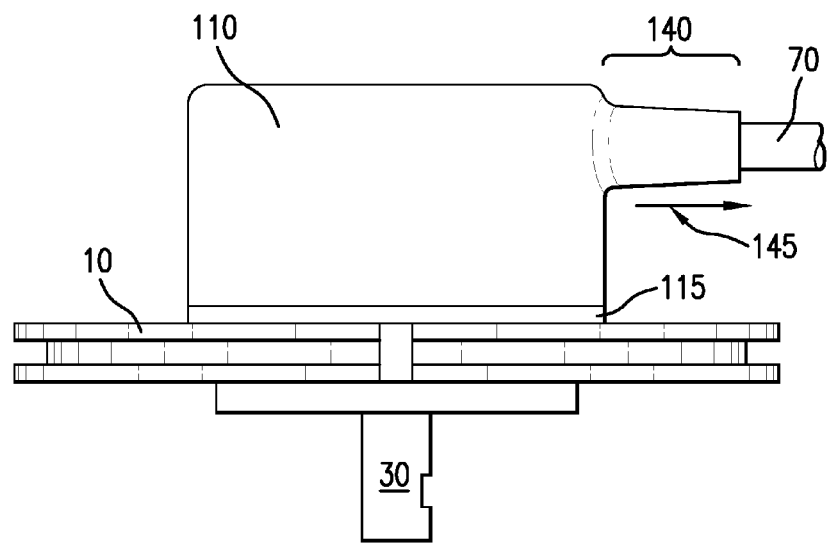
FIG. 4a is a side view of the encoder illustrated in FIG. 1 having an overmolded cover.
Figure 4B:
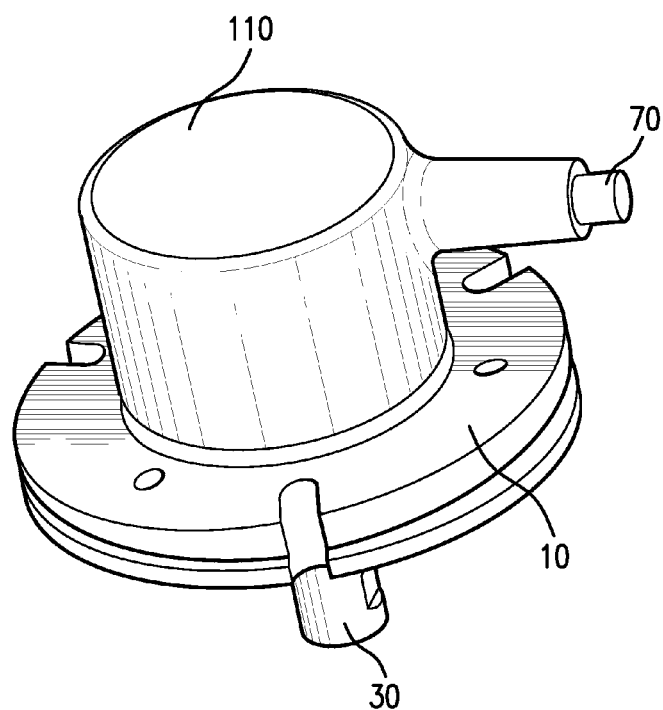

After an injection molding process (discussed in greater detail below with respect to FIGS. 5 to 8) an encoder is formed, referring to FIGS. 4a and 4b, having an overmolded cover 110 made of a polymer, e.g., an elastomer. The cover is formed above an annular section 115 of the base 10 of the stator 6. The annular section 115 has an outer diameter that forms a seal with a mold of an injection molding machine during the injection process, thus preventing flow of the polymer from passing below the top surface of the annular section 115 and serving to center the base 10 in the mold. While the cover 110 may be secured against slippage by frictional and/or adhesive forces between the stator 6 and the interior surface of the cover 110, the cover 110 is additionally secured by a channel 125, as shown in FIG. 2. The injected polymer flows into the channel 125 during the injection process. After the polymer cools and hardens, it is prevented from sliding off of the stator 6 by mechanical interference with an undercut 130 of the channel 125. While the cross-sectional profile of the channel 125 is illustrated as being rectangular, it should be appreciated that the channel profile may be any suitable shape, e.g., arcuate, curved, triangular, etc.

An tubular extension 140 extends along a portion of the cable 70 to provide strain relief to the cable 70. That is, overmolded cover 110 is overmolded to the cable 70 to provide integral strain relief to the cable. An outer diameter of the annular extension 140 gradually decreases, in this case approximately linearly, as the annular extension extends in a direction 145 away from the stator 6. Because the inner diameter of the annular extension 140 is approximately constant, the decreasing diameter results in a wall thickness of the annular extension 140 that gradually decreases along the annular extension 140 in the direction 145 away from the stator 6. This tapering structure provides a resistance to bending that is greater in regions toward the stator 6 and less in regions away from the stator 6. This may provide more gradual flexing, resulting in reduced strain on the cable 70. The annular extension is elastically flexible and is formed from the same injected material as the rest of the cover 110, e.g., an elastomeric material.

Because the cable 70 is folded such that the wires of the cable 70 have a bend of approximately 180 degrees prior to the injection molding process, the wires 75 are further protected from strain resulting from an axial force, e.g., from pulling on the cable. The injected polymer flows around and throughout the bundle of wires 75, including the bent or folded portion, during the injection molding process. This results in a cover 110 that holds and supports the wires 75 in a fixed position within the cover 110. This may be advantageous because the wires may be weaker at their junctions with the connector 85 than along their lengths. When the cable is pulled, for example, the counteracting forces are distributed along the contact area between the cover 110 and the outer surface of the wires 75, rather than being localized at the junctions between the wires 75 and the connector 85. The folding of the cable 70 also reduces strain on the connection between the connector 85 and the connector 90, as an axial pulling force would not urge the connection to uncouple.

Because the injected polymer flows freely around the elements of the stator 6, such as, e.g., the wires 75, the connectors 85, 90, and the integrated circuit 65, these components are supported, insulated, and sealed from an outer environment outside the cover 110. The added support may prevent damage and/or signal degradation due to mechanical vibration. The added insulation may provide shielding from, e.g., electromagnetic interference and short circuits between adjacent exposed wires or leads 67 of the integrated circuit 65. The sealing prevents damage to the encoder due to environment exposure, such as, e.g., water and dust damage. The cover further protects the components from damage due to impacts, such as may occur if, e.g., the unit is dropped onto a hard surface.

Figure 5:
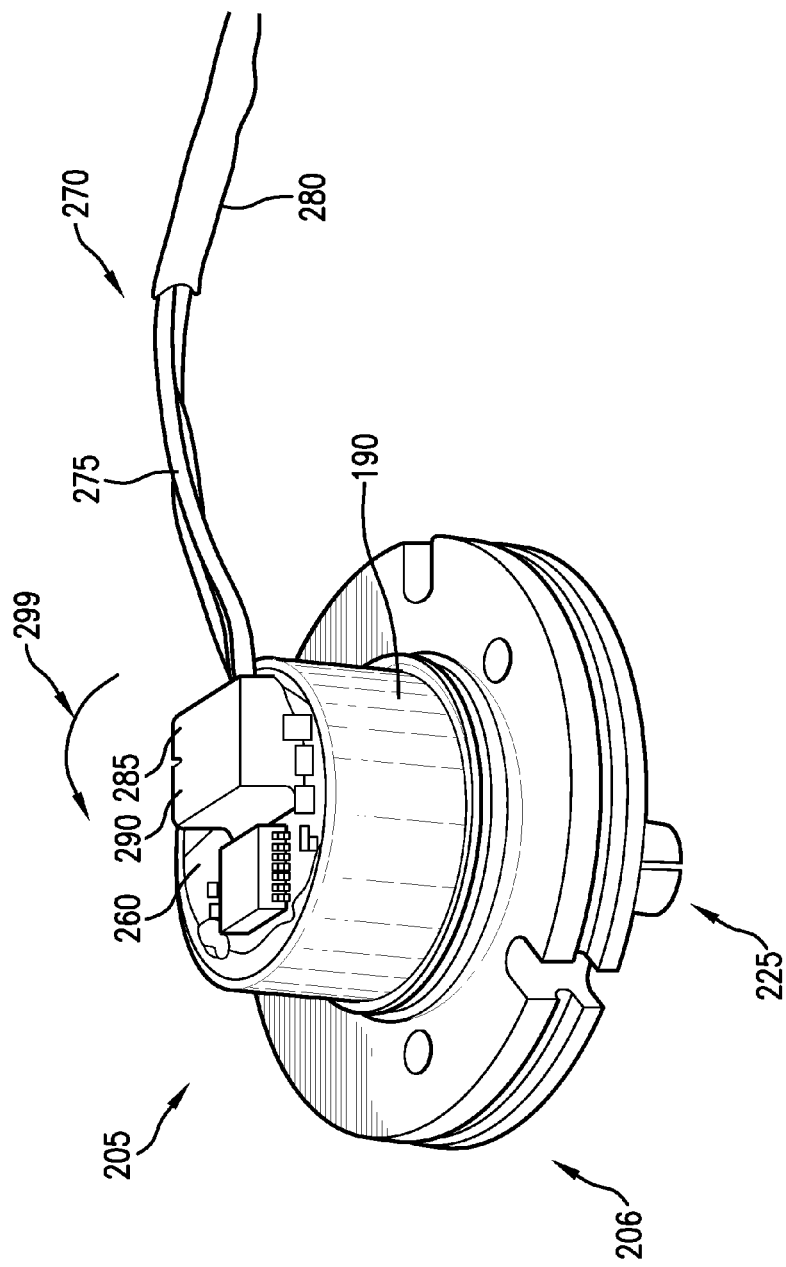
FIG. 5 is a perspective view of an encoder.

The encoder 5 does not require any masking prior to the injection molding because the housing portion 20, the printed circuit board 60, and the annular section 115 prevent the flow of injected polymer from entering an interior of the housing portion 20, where the code disk 35 is disposed. If holes are present that would allow the flow of injected polymer into the interior of the housing portion 20, such holes may be sealed prior to the injection molding process by, e.g., adhesive. The same is true for any gaps that may be present, e.g., between the printed circuit board 60 and the housing portion 20. In addition, or as an alternative, a masking may be applied, as illustrated in FIG. 5. This masking may take the form of a masking or adhesive tape.

The encoder 205 illustrated in FIGS. 5 to 8 has features analogous to those described above with regard to the encoder 5, except that a masking 190 is provided to prevent injected polymer from flowing into the interior of the encoder 205.

Figure 6:
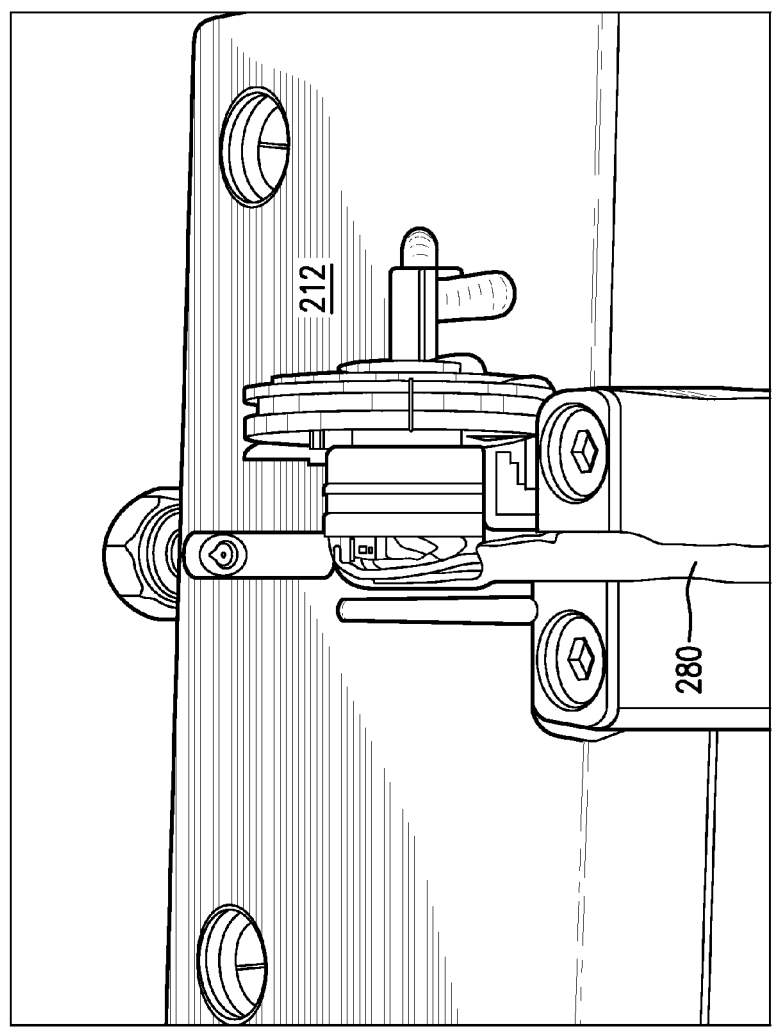
FIG. 6 is a perspective view of the encoder illustrated in FIG. 5 placed into a mold.

Before or after application of the masking 190, a cable 270 is connected to a printed circuit board 260 of the stator 206 by plugging a connector 285 into a connector 290. The cable 270 is then folded in a direction 299 to form a bend of approximately 180 degrees. The stator 206, the rotor 225, and a portion of the cable 270 are inserted into a mold 212 of a low-pressure injection molding machine, as illustrated in FIG. 6. Only a first half of the mold 212 is illustrated in FIG. 6. A corresponding second half of the mold is brought down to form an injection chamber. The second half of the mold is substantially a mirror image of the first half of the mold 212. A portion of the outer sheath 280 of the cable 270 is contained within the injection chamber, such that the wires 275 of the completed encoder will be unexposed between the injection molded cover and the outer sheath 280.

Figure 7:
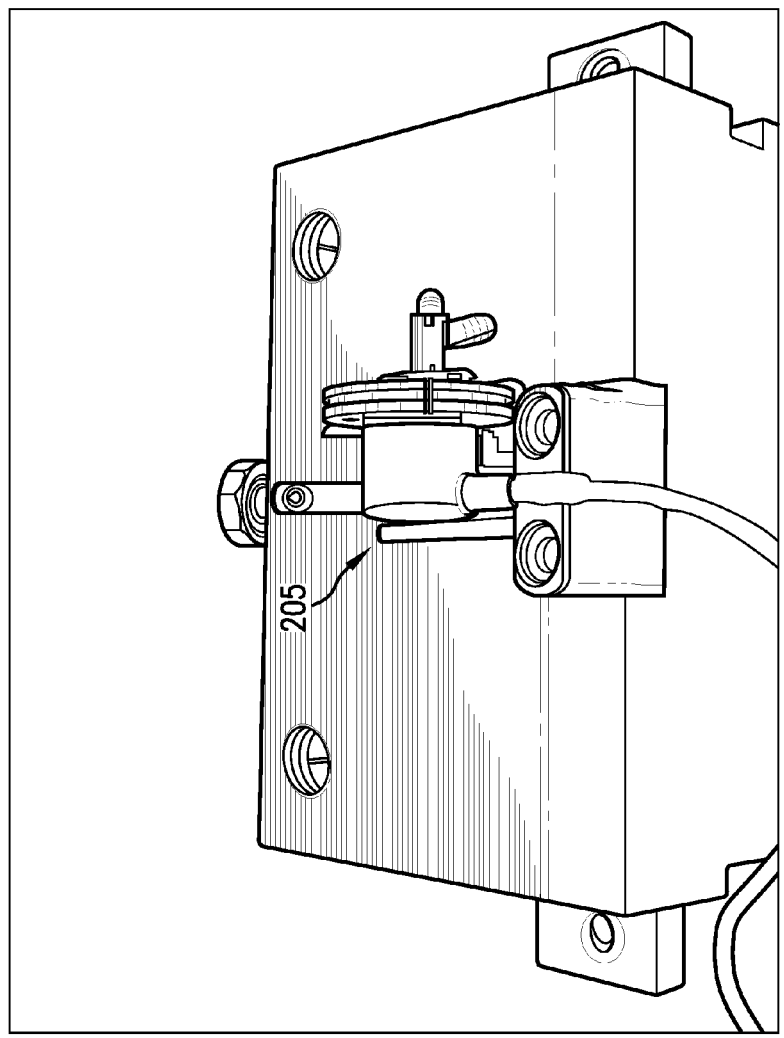
FIG. 7 is a perspective view of the encoder and mold illustrated in FIG. 6 after an injection molding process.
Figure 8:
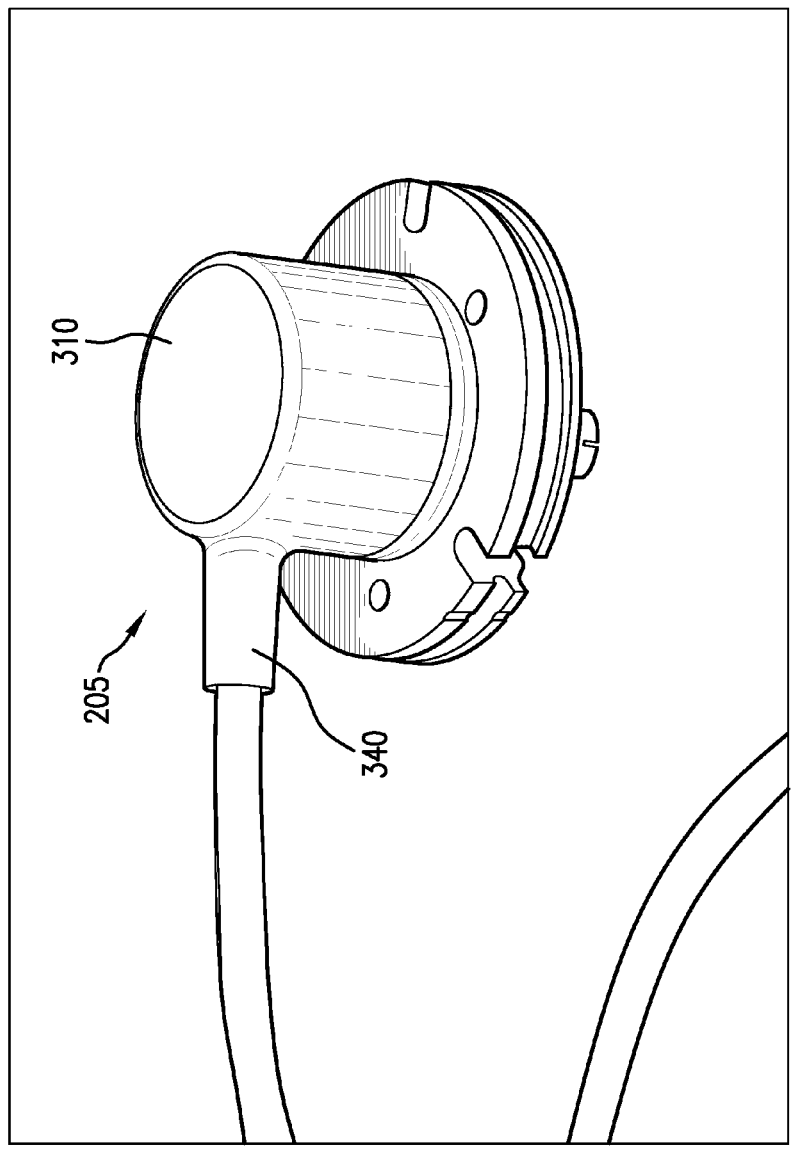
FIG. 8 is a perspective view of the encoder illustrated in FIG. 7 after removal from the mold.

After the mold is closed, a polymer, e.g., an elastomer, is injected into the injection chamber at low pressure. After the polymer has sufficiently solidified, the mold is opened, as illustrated in FIG. 7, and the completed encoder 205, with an overmolded cover 310 having an annular extension 340, is removed as illustrated in FIG. 8. The cover thus formed provides, e.g., dust protection, water protection, and strain relief for the cable.

The encoder 5 is formed in a manner identical to that described with respect to encoder 205, except that a masking is not applied.

Although the present invention has been described with reference to particular examples and exemplary embodiments, it should be understood that the foregoing description is in no manner limiting. Moreover, the features described herein may be used in any combination.

What is claimed is:

1. An encoder, comprising:
a rotor including a shaft and a code disk attached to the shaft;
a stator including a scanning unit configured to generate an electrical signal corresponding to an angular position of the code disk;
a cable configured to transmit the electrical signal; and
a cover overmolded onto the stator and the cable;
wherein the scanning unit is sealed from an outer environment by the cover and the cable is strain relieved by the cover; and
wherein the cover contacts and insulates an electrical lead of an integrated circuit of the scanning unit.

2. The encoder according to claim 1, wherein the rotor is rotatably supported within the stator by a rolling bearing.

3. The encoder according to claim 1, wherein the cover contacts and insulates a plurality of electrical leads of the integrated circuit.

4. The encoder according to claim 1, wherein the cover has a tubular extension surrounding the cable.

5. The encoder according to claim 4, wherein a wall thickness of the tubular extension tapers along the length of the tubular extension in a direction away from the stator.

6. The encoder according to claim 4, wherein the tubular extension is elastically flexible.

7. The encoder according to claim 1, further comprising a masking between the cover and the stator.

8. The encoder according to claim 1, wherein the stator has an undercut, the cover extending a distance into the undercut.

9. The encoder according to claim 1, wherein the stator has a channel extending around a surface of the stator, the cover extending into the channel.

10. The encoder according to claim 1, wherein the stator has a mounting flange.

11. The encoder according to claim 10, wherein the cover is separated from the mounting flange by an annular section of the stator.

12. The encoder according to claim 11, wherein an outer diameter of the annular section is the same as an outer diameter of the cover.

13. The encoder according to claim 1, wherein the cable has a bend of approximately 180 degrees, the bend enclosed by the cover.

14. An encoder, comprising:
a rotor including a shaft and a code disk attached to the shaft;
a stator including a scanning unit configured to generate an electrical signal corresponding to an angular position of the code disk;
a cable configured to transmit the electrical signal; and
a cover overmolded onto the stator and the cable;
wherein the scanning unit is sealed from an outer environment by the cover and the cable is strain relieved by the cover;
wherein the stator and the cable include complementary connectors, the cover overmolded onto the connectors to prevent uncoupling of the connectors.

15. An encoder system, comprising:
an encoder including:
a rotor having a shaft and a code disk attached to the shaft;
a stator having a scanning unit configured to generate an electrical signal corresponding to an angular position of the code disk;
a cable configured to transmit the electrical signal; and
a cover overmolded onto the encoder stator and the cable, the scanning unit sealed from an outer environment by the cover and the cable strain relieved by the cover; and
a motor having a rotor rotatably coupled to a stator, the rotor of the encoder coupled to the rotor of the motor, the stator of the encoder coupled to the stator of the motor;
wherein the cover contacts and insulates an electrical lead of an integrated circuit of the scanning unit.

16. A method of manufacturing an encoder, comprising:
positioning a stator of the encoder and a portion of a cable of the encoder coupled to the stator into a mold; and
overmolding, by an injection molding process, a cover onto the stator and the cable, the cover sealing the stator from an outer environment and strain relieving the cable, and the cover contacting and insulating an electrical lead of an integrated circuit of a scanning unit of the stator.

17. The method according to claim 16, wherein the cover is formed of an elastomer, the injection molding including low-pressure injection molding.

18. The method according to claim 16, further comprising: applying a masking to the stator prior to the overmolding.

19. The method according to claim 16, wherein the cover includes a tubular extension extending a distance along the cable.

20. The method according to claim 16, further comprising folding the cable by approximately 180 degrees prior to the overmolding, the cover overmolding the bend.

21. The method according to claim 16, wherein the encoder includes a rotor including a shaft and a code disk attached to the shaft, the stator includes the scanning unit configured to generate an electrical signal corresponding to an angular position of the code disk, and the cable is configured to transmit the electrical signal.

22. An encoder system, comprising:
an encoder including:
a rotor having a shaft and a code disk attached to the shaft;
a stator having a scanning unit configured to generate an electrical signal corresponding to an angular position of the code disk;
a cable configured to transmit the electrical signal; and
a cover overmolded onto the encoder stator and the cable, the scanning unit sealed from an outer environment by the cover and the cable strain relieved by the cover; and
a motor having a rotor rotatably coupled to a stator, the rotor of the encoder coupled to the rotor of the motor, the stator of the encoder coupled to the stator of the motor;
wherein the stator and the cable include complementary connectors, the cover overmolded onto the connectors to prevent uncoupling of the connectors.

23. A method of manufacturing an encoder, comprising:
positioning a stator of the encoder and a portion of a cable of the encoder coupled to the stator into a mold; and
overmolding, by an injection molding process, a cover onto the stator and the cable, the cover sealing the stator from an outer environment and strain relieving the cable;
wherein the stator and the cable include complementary connectors, the cover being overmolded onto the connectors to prevent uncoupling of the connectors.

* * * * *